(12) United States Patent
Lehmann et al.

(10) Patent No.: US 11,472,156 B2
(45) Date of Patent: Oct. 18, 2022

(54) CONFORMABLE ADHESIVE ARTICLES

(71) Applicant: 3M INNOVATIVE PROPERTIES COMPANY, St. Paul, MN (US)

(72) Inventors: Megan P. Lehmann, Stillwater, MN (US); David J. Yarusso, Shoreview, MN (US); Christina D. Cowman-Eggert, Inver Grove Heights, MN (US); Barbara K. Schmotter, Stillwater, MN (US); Corinne E. Lipscomb, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 41 days.

(21) Appl. No.: 16/499,115

(22) PCT Filed: Mar. 26, 2018

(86) PCT No.: PCT/US2018/024347
§ 371 (c)(1),
(2) Date: Sep. 27, 2019

(87) PCT Pub. No.: WO2018/183195
PCT Pub. Date: Oct. 4, 2018

(65) Prior Publication Data
US 2021/0086476 A1    Mar. 25, 2021

Related U.S. Application Data

(60) Provisional application No. 62/477,844, filed on Mar. 28, 2017.

(51) Int. Cl.
*B32B 7/06* (2019.01)
*B32B 5/18* (2006.01)
(Continued)

(52) U.S. Cl.
CPC ............... *B32B 7/06* (2013.01); *B32B 5/18* (2013.01); *B32B 7/12* (2013.01); *B32B 27/065* (2013.01);
(Continued)

(58) Field of Classification Search
CPC ........... B32B 7/06; B32B 7/12; B32B 27/065; B32B 5/18; B32B 2405/00
See application file for complete search history.

(56) References Cited

U.S. PATENT DOCUMENTS 3,294,355 A    12/1966    Topf
4,472,480 A    9/1984    Olson
(Continued)

FOREIGN PATENT DOCUMENTS

CN    2303533    1/1999
CN    101678653 A    3/2010
(Continued)

OTHER PUBLICATIONS

"Encyclopedia of Polymer Science and Engineering: Poly(phenylene Ether) to Radical Polymerization", Wiley-Interscience Publishers, New York, vol. 13, 1988, 3 pages.
(Continued)

*Primary Examiner* — Hai Vo
(74) *Attorney, Agent, or Firm* — Ann K. Gallagher

(57) ABSTRACT

The present disclosure generally relates to conformable adhesive articles that are capable of attaching or adhering to a substrate and that can be removed from the substrate without causing damage to the substrate. The present disclosure also generally relates to methods of making and using such adhesive articles. In some embodiments, the adhesive article includes (1) a releasable layer having a first major surface and a second major surface; the second major surfaces including a pressure sensitive adhesive capable of
(Continued)

adhering the adhesive article to a surface; and (2) a compliant layer having a first major surface and a second major surface; the second major surface of the compliant layer adjacent to the first major surface of the releasable layer. In some embodiments, the releasable layer debonds from both the surface and the compliant layer when the adhesive article is stretch released at an angle of less than 35 degrees.

15 Claims, 4 Drawing Sheets

(51) Int. Cl.
    *B32B 7/12*           (2006.01)
    *B32B 27/06*         (2006.01)
    *B32B 27/30*         (2006.01)
    *B32B 27/36*         (2006.01)
    *C09J 7/26*           (2018.01)

(52) U.S. Cl.
    CPC ............ *B32B 27/308* (2013.01); *B32B 27/36* (2013.01); *C09J 7/26* (2018.01); *B32B 2307/54* (2013.01); *B32B 2307/542* (2013.01); *B32B 2307/732* (2013.01); *B32B 2405/00* (2013.01); *C09J 2301/308* (2020.08)

(56) References Cited

U.S. PATENT DOCUMENTS

| | | | |
|---|---|---|---|
| 4,736,048 A | 4/1988 | Brown | |
| 4,980,443 A | 12/1990 | Kendziorski | |
| 5,409,189 A | 4/1995 | Luehmann | |
| 5,507,464 A | 4/1996 | Hamerski | |
| 5,516,581 A | 5/1996 | Kreckel | |
| 5,677,376 A | 10/1997 | Groves | |
| 5,913,480 A | 6/1999 | Luehmann | |
| 5,967,474 A | 10/1999 | doCanto | |
| 5,989,708 A | 11/1999 | Kreckel | |
| 6,004,642 A | 12/1999 | Langford | |
| 6,082,686 A | 7/2000 | Schumann | |
| 6,131,864 A | 10/2000 | Schumann | |
| 6,403,206 B1 | 6/2002 | Bries | |
| 6,558,789 B1 | 5/2003 | Hamerski | |
| 6,572,945 B2 | 6/2003 | Bries | |
| 6,811,126 B2 | 11/2004 | Johansson | |
| 6,835,452 B1 | 12/2004 | Hamerski | |
| 6,972,141 B1 | 12/2005 | Bries | |
| 7,028,958 B2 | 4/2006 | Pitzen | |
| 7,121,515 B2 | 10/2006 | Franck | |
| 7,216,841 B2 | 5/2007 | Dodig | |
| 7,781,056 B2 | 8/2010 | Bries | |
| D665,653 S | 8/2012 | Thompson | |
| 8,241,720 B2 | 8/2012 | Sudo | |
| 8,557,378 B2 | 10/2013 | Yamanaka | |
| 8,708,305 B2 | 4/2014 | McGreevy | |
| 9,228,117 B2 | 1/2016 | Sherman | |
| 9,238,758 B2 | 1/2016 | Determan | |
| 9,346,979 B2 | 5/2016 | Sheridan et al. | |
| 9,894,931 B2 | 2/2018 | Zhou | |
| 2001/0028022 A1 | 10/2001 | Hamerski et al. | |
| 2007/0207311 A1 | 9/2007 | Kaluck | |
| 2008/0135159 A1 | 6/2008 | Bries | |
| 2009/0205784 A1* | 8/2009 | Sudo | C09J 7/381 156/391 |
| 2011/0250375 A1 | 10/2011 | Bries | |
| 2011/0268929 A1 | 11/2011 | Tran | |
| 2014/0306076 A1 | 10/2014 | Friesch | |
| 2015/0298446 A1 | 10/2015 | Mikami | |
| 2017/0016039 A1 | 1/2017 | Skory | |

FOREIGN PATENT DOCUMENTS

| | | |
|---|---|---|
| CN | 201510086 | 6/2010 |
| DE | 102004030252 | 6/2006 |
| EP | 0237966 | 9/1987 |
| EP | 0997512 | 1/2004 |
| WO | WO 1995-006691 | 3/1995 |
| WO | WO 97/07172 A1 | 2/1997 |
| WO | WO 2015-035556 | 3/2015 |
| WO | WO 2015-035960 | 3/2015 |
| WO | WO 2015-195602 | 12/2015 |
| WO | WO 2017-136188 | 8/2017 |
| WO | WO 2017-136189 | 8/2017 |
| WO | WO 2017-136219 | 8/2017 |
| WO | WO 2017-136279 | 8/2017 |
| WO | WO 2017-136280 | 8/2017 |
| WO | WO 2018-039584 | 3/2018 |

OTHER PUBLICATIONS

"Encyclopedia of Polymer Science and Technology, Plastics, Resins, Rubbers, Fibers" Wiley-Interscience Publishers, New York, vol. 16, 1964, 24 pages.

International Search Report for PCT International Application No. PCT/US2018/024347, dated Jun. 4, 2018, 5 pages.

\* cited by examiner

CONFORMABLE ADHESIVE ARTICLES

CROSS REFERENCE TO RELATED APPLICATIONS

This application is a national stage filing under 35 U.S.C. 371 of PCT/US2018/024347, filed Mar. 26, 2018, which claims the benefit of provisional Application No. 62/477,844, filed Mar. 28, 2017, the disclosure of which is incorporated by reference in its/their entirety herein.

TECHNICAL FIELD

The present disclosure generally relates to conformable adhesive articles that are capable of attaching or adhering to a substrate and that can be removed from the substrate without causing damage to the substrate. The present disclosure also generally relates to methods of making and using such adhesive articles.

BACKGROUND

The revolutionary Command® Adhesive Strip products are a line of stretch removable adhesive strips that hold strongly on a variety of surfaces (including paint, wood, and tile) and that remove cleanly—no holes, marks, or sticky residue. These products generally have utility in bonding to various surfaces or substrates for numerous applications.

In general, these products include a stretch release adhesive composition disposed on tape or other backings. Stretch releasable adhesives are high performance pressure-sensitive adhesives that combine strong holding power with clean removal and no surface damage. Stretch releasable adhesive products are designed to firmly adhere an article, such as a hook (to hold a picture or an article of clothing) or other decorative or utilitarian element, to a surface (an adherend), yet remove cleanly when pulled away from the architectural surface at a low angle. The clean removal aspect means that a tacky and/or unsightly residue is not left behind on the surface after removal of the stretch release adhesive and that no damage to the surface occurs during the removal process. During the process of stretch release removal, the adhesive layer typically remains adhered to the tape backing as the backing is stretched, but releases from the surface (adherend).

SUMMARY

The inventors of the present disclosure recognized that the existing adhesive products could be improved or enhanced by improving conformability to the substrate or surface to which they are applied, attached, and/or mounted. In some instances, the enhanced conformability permits the adhesive articles to hold more weight. In some embodiments, the enhanced conformability permits the adhesive articles to be used on new surfaces (e.g., cinderblock). In some embodiments, the enhanced conformability increases or enhances the product performance on certain surfaces (e.g., rough or textured surfaces such as, for example, wallpaper, drywall, etc.).

The inventors of the present disclosure recognized that increasing the conformability of the adhesive articles would provide increased or enhanced performance. The inventors of the present disclosure also recognized that providing a stretch release layer that detaches from a conformable backing layer during the removal process is a novel and effective method to increase conformability of the adhesive article while maintaining the damage-free features of the product.

In some embodiments, the present disclosure relates to an adhesive article, comprising a releasable layer having a first major surface and a second major surface. The second major surface including a pressure sensitive adhesive capable of adhering the adhesive article to a surface. The article further includes a compliant layer having a first major surface and a second major surface, with the second major surface of the compliant layer adjacent to the first major surface of the releasable layer; and a hardgood adjacent to the first major surface of the compliant layer. In some embodiments, the releasable layer is a stretch releasable layer.

In some embodiments, the releasable layer debonds from both the surface and the compliant layer when the adhesive article is stretch released at an angle of less than 35 degrees, and the hardgood does not debond from the compliant layer when the adhesive article is stretch released at an angle of less than 35 degrees.

In some embodiments the compliant layer increases the area of adhesive contact to the substrate by at least 10% according to the Percent Adhesive Surface Contact Test Method.

Figure 1:
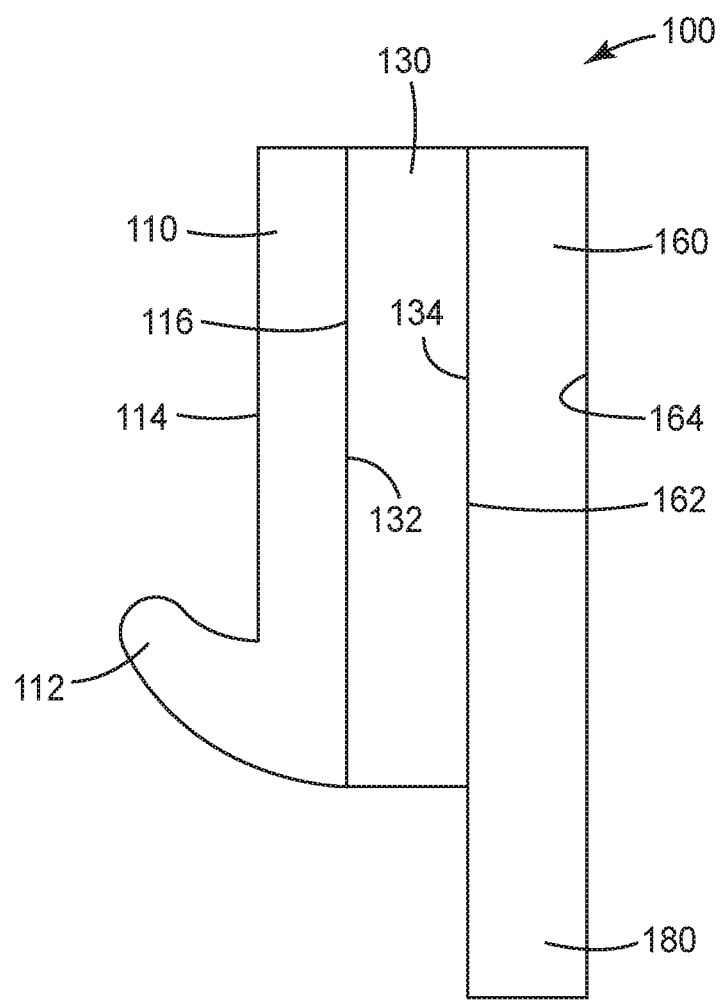
FIG. 1 is a side view of one embodiment of an exemplary adhesive article of the type generally described herein.

In the following detailed description, reference may be made to the above-described set of drawings in which are shown by way of illustration several exemplary embodiments. It is to be understood that other embodiments are contemplated and may be made without departing from the scope or spirit of the present disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The present disclosure generally relates to adhesive articles that can be removed from a substrate, wall, or surface (generally, an adherend) without damage. The adhesive article includes (1) a releasable layer adjacent to (2) a conformable or compliant layer. In presently preferred implementations described herein, the releasable layer is a stretch-releasable layer. In other implementations, the releasable layer is peelable (i.e., it includes a peel-release adhesive). The resulting adhesive article can be attached to or positioned adjacent to a hardgood. During stretch release removal, the releasable layer detaches or deforms from both (1) the adherend as well as (2) from the conformable or compliant layer.

The releasable layer provides excellent adhesion and shear holding power during use as well as damage-free removal from the wall, surface, or substrate to which the adhesive article is adhered, mounted, or attached. In embodiments featuring a stretch releasable layer, the releasable layer a single or multilayer construction that can be removed from a substrate or surface by stretching it at an angle of less than 35°. In embodiments featuring a peel-releasable layer, the peel releasable layer is a single or multilayer construction that can be removed from a substrate or surfaces by stretching it an angle of 35° or greater. In some embodiments, the releasable adhesive may be removed by a combination of stretch and peel-release mechanisms.

The conformable or compliant layer provides the adhesive article with excellent conformability to whatever texture or roughness is provided by the surface, substrate, or wall to which the adhesive article is applied. As used herein, the terms "compliant layer" or "conformable layer" refer to a layer of material applied to one side of a hardgood to increase the adhesive contact to the substrate by at least 10% as compared to an adhesive article of otherwise similar construction without a compliant layer according to the % Adhesive Surface Contact Test Method described below. In presently preferred embodiments, the compliant layer increases the adhesive contact to the substrate by at least 20%, in some embodiments at least 30%, in some embodiments at least 40%, in some embodiments at least 50%, and in yet other embodiments at least 60%.

The resulting adhesive articles offer enhanced conformability while maintaining the excellent damage-free removal and shear and holding power properties typical of commercially available Command™ brand products. In some embodiments, the adhesive articles described herein can hold the same or more weight than existing Command™ brand products. In some embodiments, the adhesive articles described herein can be used on new surfaces that have rough or textured surfaces (e.g., cinderblock).

FIG. 1 shows one exemplary embodiment of an adhesive article 100 of the type generally described herein. Adhesive article 100 includes a hardgood 110 (shown in FIG. 1 as a hook), a compliant or conformable layer 130, and a releasable layer 160. The specific hardgood 110 shown in FIG. 1 includes a hook 112 extending from a first major surface 114 both of which are opposite and spaced apart from a second major surface 116. Second major surface 114 of hardgood 110 is adjacent to a first major surface 132 of compliant layer 130. First major surface 132 of compliant layer 130 is spaced apart from and opposite to a second major surface 134 of compliant layer 130. Second major surface 134 of compliant layer 130 is adjacent to a first major surface 162 of releasable layer 160. First major surface 162 of releasable layer 160 is spaced apart from and opposite to a second major surface 164 of stretch releasable layer 160.

In the specific implementation of FIG. 1, adhesive article 100 include a tab 180. Tab 180 is an area that can be easily accessed by the user to assist in or begin to release the adhesive article from the adherend. Tab 180 can be tacky from the outermost adhesive layer or non-tacky by being covered by layers of stretch film, non-stretch film, release liner, or from detackified adhesive. In some embodiments, tab 180 is a portion of or made from the same material as stretch releasable layer 160. In some embodiments, tab 180 is made from different materials than stretch releasable layer 160.

Figure 2:
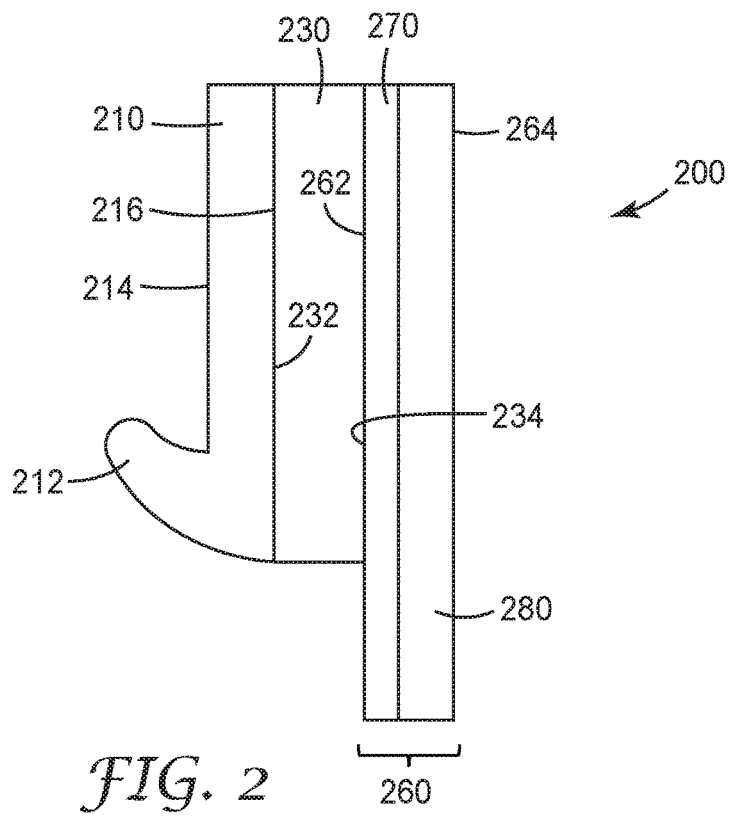
FIG. 2 is a side view of one embodiment of an exemplary adhesive article of the type generally described herein.

To attach adhesive article 100 to an adherend, a user positions second major surface 164 of releasable layer 160 directly adjacent to the adherend, presses on the adhesive article to obtain a strong bond between the releasable layer and the adherend, and then steps back to view the resulting hung or mounted adhesive article. To remove adhesive article 100 from an adherend, a user grasps tab 180 and pulls and stretches it away from the adherend, preferably at an angle of 35° or less or peels the adhesive article 100 from the adherend at an angle of 35° or greater FIG. 2 shows one exemplary embodiment of an adhesive article 200 of the type generally described herein. Adhesive article 200 includes a hardgood 210 (shown in FIG. 2 as a hook), a compliant or conformable layer 230, and a multilayer releasable layer 260. Multilayer releasable layer 260 may include a carrier 270 and an adhesive layer 280. In certain embodiments, the carrier 270 is a stretchable film layer. In other embodiments, the carrier 270 can be a polymeric film layer, a conformable layer, an additional adhesive layer, or combinations thereof. As used herein, a stretchable film layer is any layer of polymeric film selected so that it can be stretched (elongated) in a first direction (e.g., a lengthwise direction) at least 50 percent without breaking. The specific hardgood 210 shown in FIG. 2 includes a hook 212 extending from a first major surface 214 both of which are opposite and spaced apart from a second major surface 216. Second major surface 214 of hardgood 210 is adjacent to a first major surface 232 of compliant layer 230. First major surface 232 of compliant layer 230 is spaced apart from and opposite to a second major surface 234 of compliant layer 230. Second major surface 234 of compliant layer 230 is adjacent to a first major surface 262 of releasable layer 260. First major surface 262 of releasable layer 260 is spaced apart from and opposite to a second major surface 264 of releasable layer 260. In the specific implementation of FIG. 2, adhesive article 200 include a tab 280.

Figure 3:
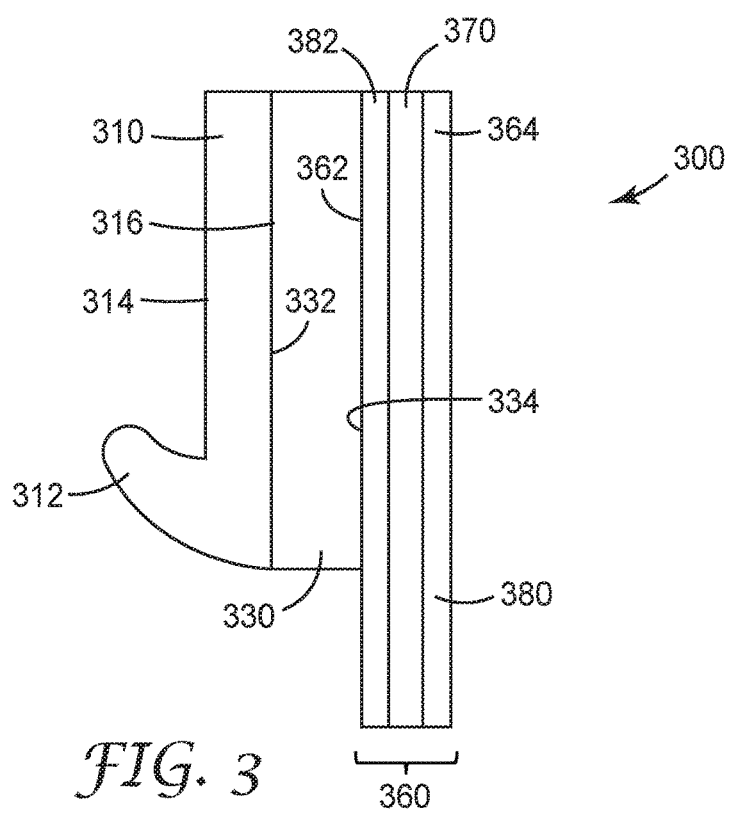
FIG. 3 is a side view of one embodiment of an exemplary adhesive article of the type generally described herein.

FIG. 3 shows one exemplary embodiment of an adhesive article 300 of the type generally described herein. Adhesive article 300 includes a hardgood 310 (shown in FIG. 3 as a hook), a compliant or conformable layer 330, and a multilayer releasable layer 360. Multilayer releasable layer 360 includes a carrier 370 between two adhesive layers (first adhesive layer 380 and second adhesive layer 382). More information about each of these layers is below. First and second adhesive layers 380, 282 can be the same or different. The carrier 370, like carrier 270, may be a stretch releasable layer or film and/or can contribute to peel release, and may include a polymeric film layer, a conformable layer, an additional adhesive layer, or combinations thereof.

The specific hardgood 310 shown in FIG. 3 includes a hook 312 extending from a first major surface 314 both of which are opposite and spaced apart from a second major surface 316. Second major surface 316 of hardgood 310 is adjacent to a first major surface 332 of compliant layer 330. First major surface 332 of compliant layer 330 is spaced apart from and opposite to a second major surface 334 of compliant layer 330. Second major surface 334 of compliant layer 330 is adjacent to a first major surface 362 of stretch releasable layer 360. First major surface 362 of stretch releasable layer 360 is spaced apart from and opposite to a second major surface 364 of stretch releasable layer 360. In the specific implementation of FIG. 3, adhesive article 300 includes a tab 380.

Figure 4:
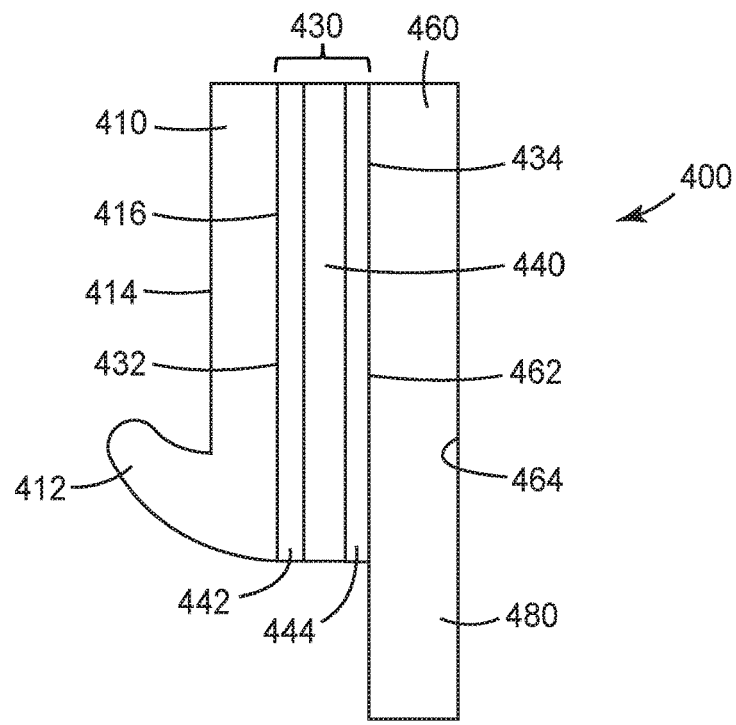
FIG. 4 is a side view of one embodiment of an exemplary adhesive article of the type generally described herein.

FIG. 4 shows one exemplary embodiment of an adhesive article 400 of the type generally described herein. Adhesive article 400 includes a hardgood 410 (shown in FIG. 4 as a hook), a multilayer compliant or conformable layer 430, and a releasable layer 460. Multilayer compliant or conformable layer 430 includes a conformable layer 440 between two adjacent layers (first adhesive layer 442 and second layer 444). More information about each of these layers is below. First and second layers 442, 444 can be the same or different. Second layer 444 can be a stretchable film layer, non-stretchable film layer, compliant or conformable layer, adhesive layer or combinations thereof. In a particular embodiment of an adhesive article 400, the first and second layers 442, 444 are each an adhesive layer. The specific hardgood 410 shown in FIG. 4 includes a hook 412 extending from a first major surface 414 both of which are opposite and spaced apart from a second major surface 416. Second major surface 416 of hardgood 410 is adjacent to a first major surface 432 of multilayer compliant layer 430. First major surface 432 of compliant layer 430 is spaced apart from and opposite to a second major surface 434 of compliant layer 430. Second major surface 434 of compliant layer 430 is adjacent to a first major surface 462 of releasable layer 460. First major surface 462 of releasable layer 460 is spaced apart from and opposite to a second major surface 464 of releasable layer 460. In the specific implementation of FIG. 4, adhesive article 400 include a tab 480.

Figure 5:
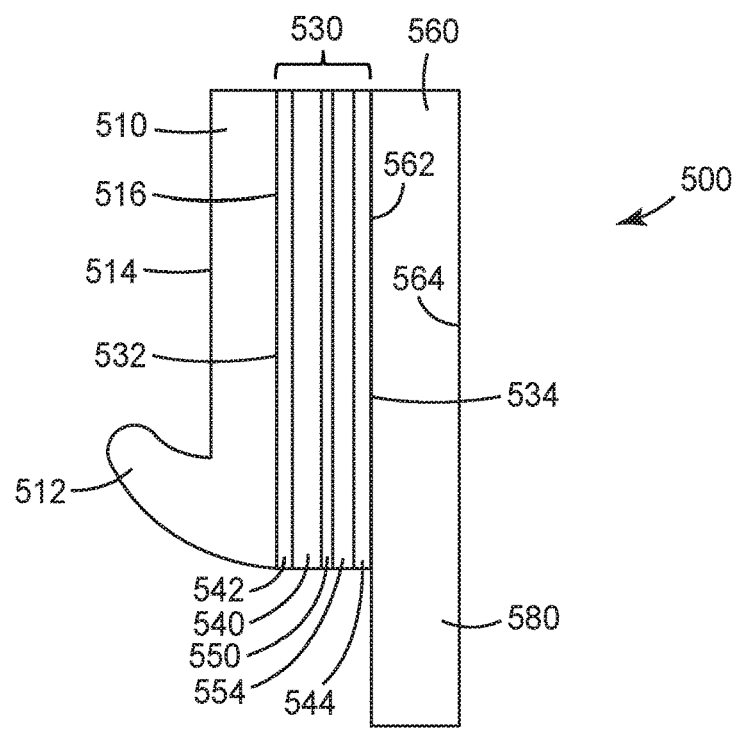
FIG. 5 is a side view of one embodiment of an exemplary adhesive article of the type generally described herein.

FIG. 5 shows one exemplary embodiment of an adhesive article 500 of the type generally described herein. Adhesive article 500 includes a hardgood 510 (shown in FIG. 5 as a hook), a multilayer compliant or conformable layer 530, and a releasable layer 560. Multilayer compliant or conformable layer 530 includes five layers as follows: a first adhesive layer 542; a first conformable layer 540; a film or foil layer 550; a second conformable layer 554; and a second adhesive layer 544. More information about each of these layers is below. First and second adhesive layers 542, 544 can be the same or different. The specific hardgood 510 shown in FIG. 5 includes a hook 512 extending from a first major surface 514 both of which are opposite and spaced apart from a second major surface 516. Second major surface 516 of hardgood 510 is adjacent to a first major surface 532 of multilayer compliant layer 530. First major surface 532 of compliant layer 530 is spaced apart from and opposite to a second major surface 534 of compliant layer 530. Second major surface 534 of compliant layer 530 is adjacent to a first major surface 562 of releasable layer 560. First major surface 562 of releasable layer 560 is spaced apart from and opposite to a second major surface 564 of releasable layer 560. In the specific implementation of FIG. 5, adhesive article 500 include a tab 580.

Any of the above layers can be combined in differing combinations. For example, any of the described compliant or conformable layers (including the single or multilayers) can be combined with any of the described releasable layers (including the single or multilayers). The resulting adhesive article can be combined with any desired hardgood. Some exemplary embodiments showing these combinations are described in FIGS. 6 and 7.

Figure 6:
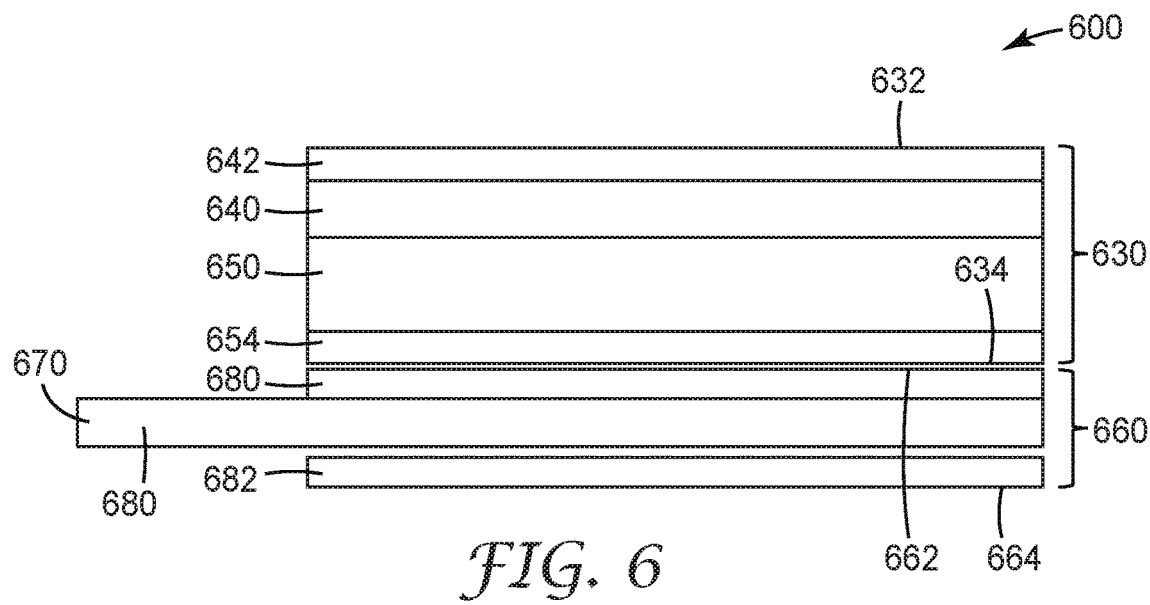
FIG. 6 is a side view of one embodiment of an exemplary adhesive article of the type generally described herein.

FIG. 6 shows one exemplary embodiment of an adhesive article 600 of the type generally described herein. Adhesive article 600 includes a multilayer compliant or conformable layer 630, and a multilayer releasable layer 660. Multilayer compliant or conformable layer 630 includes four layers as follows: a first adhesive layer 642; a first film layer 640; a compliant layer 650; and a second film layer 654. More information about each of these layers is below. Multilayer releasable layer 660 includes a film layer 670 between two adhesive layers (first adhesive layer 680 and second adhesive layer 682). First major surface 632 of compliant layer 630 is spaced apart from and opposite to a second major surface 634 of compliant layer 630. Second major surface 634 of compliant layer 630 is adjacent to a first major surface 662 of stretch releasable layer 660. First major surface 662 of releasable layer 660 is spaced apart from and opposite to a second major surface 664 of releasable layer 660. In the specific implementation of FIG. 6, adhesive article 600 include a tab 680 formed by the releasable film layer 670. The adhesive article 600 of FIG. 6 can be used with any desired hardgood (not shown).

Figure 7:
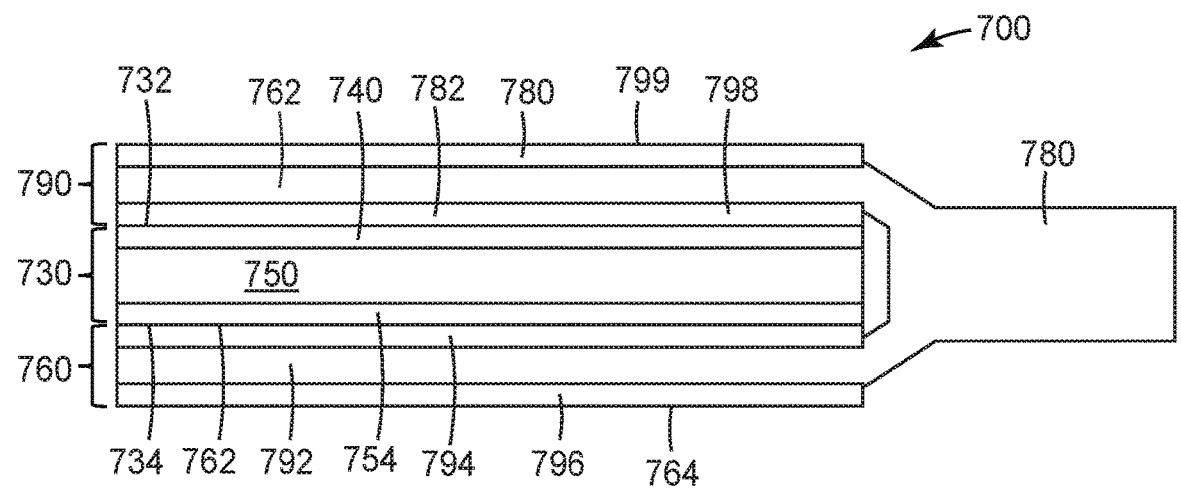
FIG. 7 is a side view of one embodiment of an exemplary adhesive article of the type generally described herein.

FIG. 7 shows one exemplary embodiment of an adhesive article 700 of the type generally described herein. Adhesive article 700 includes a multilayer compliant or conformable layer 730, between first and second multilayer releasable layers 760 and 790, respectively. In other embodiments (not shown) first and second multilayer or single layer s releasable layers could both be positioned on one side of compliant or conformable layer 730. The exemplary multilayer compliant or conformable layer includes a compliant layer 750 between two film layers 740 and 754, respectively. In other embodiments, the compliant or conformable layer can be a single layer. Each of first and second multilayer releasable layers 760 and 790, respectively, includes a film layer 762,792 between two adhesive layers (first adhesive layers 780, 794 and second adhesive layer 782, 796). First major surface 732 of compliant layer 730 is spaced apart from and opposite to a second major surface 734 of compliant layer 730. Second major surface 734 of compliant layer 730 is adjacent to a first major surface 762 of the releasable layer 760. First major surface 762 of the releasable layer 760 is spaced apart from and opposite to a second major surface 764 of the releasable layer 760. First major surface 732 of compliant layer 730 is adjacent to a first major surface 798 of the releasable layer 790. Second major surface 799 of the releasable layer 790 is spaced apart from and opposite to first major surface 798 of stretch releasable layer 760.

In the specific implementation of FIG. 7, adhesive article 700 include a tab 780 that is formed by each of first and second film layers 762,792. Each of these film layers extend outwardly from the multilayer construction and meet to form tab 780. The specific shape and size of tab 780 as shown in FIG. 7 is merely exemplary and any desired tab can be used.

Releasable Layers and Films:

The releasable layers and/or films that may be used in the constructions described herein may be of any suitable construction. For example, the releasable layers or films can be in the form of a foam, a film, or a combination thereof with any suitable thickness, composition, and opaqueness or clarity. The releasable layers and/or films can be a single layer of film, a single layer of foam, multiple layers of film, multiple layers of foam, multiple layers of foam and film, and/or single or multiple layers of adhesive.

A multiple layer construction including, for example, a film layer bonded to a foam layer may be formed using any suitable mechanism including, for example, coextruding the film and the foam layer, co-molding, extrusion coating, joining through an adhesive composition, joining under pressure, joining under heat, and combinations thereof. Useful adhesive compositions for bonding a film layer to the foam layer include the adhesive compositions described herein. Where only one polymeric film or foam layer of a multi-layer backing is intended to be stretched to effect debonding, that layer should exhibit sufficient physical properties, and be of a sufficient thickness, to achieve that objective.

The releasable layer and/or film can be selected to have suitable mechanical properties for use in a stretch release adhesive tape. For example, the stretch releasable layer and/or film may be selected so that it can be stretched (elongated) in a first direction (e.g., a lengthwise direction) at least 50 percent without breaking. That is, at least one dimension such as the length of the releasable layer and/or film can be increased through stretching at least 50 percent without breaking. In some embodiments, the releasable layer and/or film can be stretched at least 100 percent, at least 150 percent, at least 200 percent, at least 300 percent, at least 400 percent, or at least 500 percent without breaking. The releasable layer and/or film can often be stretched up to 1200 percent, up to 1000 percent, up to 800 percent, up to 750 percent, or up to 700 percent without breaking. These relatively large elongation values facilitate stretch releasing of the adhesive article after being adhered to an object and/or substrate.

The Young's Modulus of the releasable layer and/or film can be an indicator of the resistance of the releasable layer and/or film to stretching. In certain embodiments, the Young's modulus of the releasable layer and/or film may be no greater than 75,000 psi (about 520 MPa), no greater than about 50,000 psi (about 345 MPa), no greater than 25,000 psi (about 170 MPa), no greater than 10,000 psi (about 70 MPa), no greater than 5,000 psi (about 3.4 MPa), no greater than 1,000 psi (about 7 MPa), or no greater than 500 psi (about 3.4 MPa). For some stretch releasable layers and/or films, such as those described below that contain a poly(alkylene) copolymer, the Young's Modulus is often in the range of about 10 MPa to about 75 MPa. For example, the Young's Modulus can be in the range of 20 to 75 MPa, in the range of 20 to 60 MPa, in the range of 20 to 50 MPa, or in the range of 25 to 50 MPa. The Young's Modulus can be measured, for example, using method ASTM D790-07 or ASTM D882-02.

In many applications, the releasable layers and/or films are prepared from a polymeric material such as, for example, a polyolefin (e.g., polyethylene such as high density polyethylene, low density polyethylene, linear low density polyethylene, and linear ultralow density polyethylene, polypropylene, and polybutylene), vinyl copolymers (e.g., polyvinyl chloride and polyvinyl acetates), olefinic copolymers (e.g., ethylene/methylacrylate copolymers, ethylene/vinyl acetate copolymers, and ethylene/propylene copolymers), acrylonitrile-butadiene-styrene copolymers, acrylic polymers and copolymers, polyurethanes, and combinations or blends thereof. Exemplary blends include polypropylene/polyethylene blends, polyurethane/polyolefin blends, polyurethane/polycarbonate blends, and polyurethane/polyester blends. Other suitable blends may include, for example, blends of thermoplastic polymers, elastomeric polymers and combinations thereof. Suitable blends can include, for example, styrene-butadiene copolymers, polychloroprenes (i.e., neoprene), nitrile rubbers, butyl rubbers, polysulfide rubbers, cis-1,4-polyisoprenes, ethylene-propylene terpolymers (e.g., EPDM rubber), silicone rubbers, silicone polyurea block copolymers, polyurethane rubbers, natural rubbers, acrylate rubbers, thermoplastic rubbers (e.g., styrene-butadiene block copolymers, styrene-isoprene-styrene block copolymers, styrene-ethylene/butylene-styrene block copolymers, styrene-ethylene/propylene-styrene block copolymers), thermoplastic polyolefin rubber materials, and combinations thereof.

In some embodiments, the releasable layer and/or film contains a poly(alkylene) copolymer that is derived from at least two different alkene monomers. The poly(alkylene) copolymer is typically the reaction product of an alkene mixture that includes 1) a first alkene selected from ethene, propene, or a mixture thereof and 2) a second alkene monomer selected from a 1,2-alkene having 4 to 8 carbon atoms. For example, the second alkene monomer often has four, six, or eight carbon atoms. That is, the alkene mixture includes 1) ethene, propene, or a mixture thereof and 2) butene, hexene, octene, or a mixture thereof. These copolymers are typically prepared using a metallocene catalyst. Mixtures or combinations of these copolymers may also be used.

A useful foam releasable layer and/or film is typically conformable and assists in increasing the degree of surface contact between the pressure-sensitive adhesive layer disposed thereon and the surface of the substrate. The foam layer preferably is capable of achieving from about 50 percent to about 600 percent elongation (i.e., the foam layer is stretchable at least 50 percent to 600 percent). The elongation at break is preferably sufficiently high so that the releasable layer and/or film remains intact during removal of the adhesive tape from a substrate to which it has been adhered.

The foam releasable layers and/or films may be selected to optimize properties such as conformability and resiliency. Conformable and resilient polymeric foams are well suited for applications in which the adhesive article is to be adhered to substrates having surface irregularities. The foam layer may have a density of at least about 2 pounds per cubic foot (pcf), at least about 6 pcf, at least about 8 pcf, or at least about 12 pcf, less than about 30 pcf, less than about 25 pcf, or even less than about 15 pcf. The foam layer can have any thickness suitable for the intended application. Suitable foam backing layers often have a thickness of at least 5 mils or at least 30 mils. The thickness can be up to 100 mils, up to 125 mils, up to 150 mils, or even greater. In some embodiments the foam layer includes multiple layers of foam and each layer of foam contributes a different property such as density, percent elongation, tensile strength, and combinations thereof.

Examples of useful polymeric backing materials for stretch releasing pressure-sensitive adhesive assemblies are disclosed in U.S. Pat. No. 5,516,581 and PCT Application No. WO 95/06691, the entire contents of which are hereby incorporated by reference. Useful polyethylene vinyl acetate copolymer foams are available under the VOLEXTRA and VOLARA series of trade designations from Voltek, Division of Sekisui America Corporation, Lawrence, Mass.

Polymeric film backing layers can be in a variety of forms including, for example, a single-layer or multi-layer film, a porous film, and combinations thereof. The polymeric film may contain one or more fillers (e.g., calcium carbonate). The polymer film can be a continuous layer or a discontinuous layer. Multi-layer polymer films are preferably integrally bonded to one another in the form of a composite film, a laminate film, and combinations thereof. Multilayer polymeric films can be prepared using any suitable method including, for example, co-molding, coextruding, extrusion coating, joining through an adhesive, joining under pressure, joining under heat, and combinations thereof.

A releasable layer including a compliant layer and a film layer can have these layers bonded to one another using any suitable mechanism including, for example, coextruding the film and the foam layer, co-molding, extrusion coating, joining through an adhesive composition, joining under pressure, joining under heat, and combinations thereof. Any suitable adhesive compositions for bonding a film layer to the foam layer can be used. Where only one polymeric film or foam layer of a multi-layer backing is intended to be stretched to effect debonding, that layer should exhibit sufficient physical properties and be of a sufficient thickness to achieve that objective.

In embodiments where the releasable layer and/or film includes at least a foam layer and a film layer, the film layer may contain a poly(alkylene) copolymer that is derived from at least two different alkene monomers. The poly(alkylene) copolymer is typically the reaction product of an alkene mixture that includes 1) a first alkene selected from ethene, propene, or a mixture thereof and 2) a second alkene monomer selected from a 1,2-alkene having 4 to 8 carbon atoms. For example, the second alkene monomer often has four, six, or eight carbon atoms. That is, the alkene mixture includes 1) ethene, propene, or a mixture thereof and 2) butene, hexane, octane, or a mixture thereof. These copolymers are typically prepared using a metallocene catalyst. Mixtures or combinations of these copolymers may also be used.

Other suitable adhesive article constructions including adhesive compositions and backing materials are disclosed in EP237966, U.S. Pat. Nos. 9,228,117, 9,238,758, 8,557, 378, and US Publication No. 2011/0268929 (Tran et al.), the entire contents of which are hereby incorporated by reference.

In some embodiments, the releasable layer and/or film is usually a rubbery material and can be slightly tacky. A pressure-sensitive adhesive layer can be positioned adjacent to at least one major surface of the stretch releasable layer and/or film. In many embodiments, a first pressure-sensitive adhesive layer is positioned adjacent to a first major surface of the releasable layer and/or film and a second pressure-sensitive adhesive layer is positioned adjacent to a second major surface of the releasable layer and/or film. The second major surface of the releasable layer and/or film is the surface opposite the first major surface. As used herein, the term "adjacent" with reference to the pressure-sensitive adhesive layer and the backing layer means that the pressure-sensitive adhesive layer directly contacts the backing layer or is separated from the backing layer by one or more intervening layers. That is, each pressure-sensitive adhesive layer is adhered directly or indirectly to the backing layer. Exemplary intervening layers include, for example, a primer layer or a layer resulting from a priming treatment.

The releasable layer and/or film may be subjected to a priming treatment prior to being positioned adjacent to the at least one pressure-sensitive adhesive layer. The primer treatment tends to increase adhesion between the releasable layer and/or film and the pressure-sensitive adhesive layer. This increased adhesion is often desirable for a stretch releasing adhesive tape. That is, it is usually desirable, in embodiments of the present disclosure designed for stretch release, that the adhesion of the pressure-sensitive adhesive layer to the releasable layer and/or film is stronger than the adhesion of the pressure-sensitive adhesive layer to the substrate. Any suitable priming treatment known in the art can be used. For example, the priming treatment can include treatment with a chemical primer composition, treatment with a corona discharge or plasma discharge, exposure to an electron beam or ultraviolet light, acid etching, or combinations thereof.

In some embodiments, the primer treatment includes applying a primer composition to a surface of the releasable layer and/or film. Any suitable primer composition can be used. The primer composition can include, for example, a reactive chemical adhesive promoter (e.g., the components can react with the backing layer, the adhesive layer, or both). Exemplary primer compositions include those described in U.S. Pat. No. 5,677,376 (Groves), incorporated herein by reference in its entirety. That is, the primer composition can include a blend of (1) a block copolymer such as styrene-ethylene/butylene-styrene block copolymer that is modified with maleic acid or maleic anhydride and (2) the polymeric reaction product of monovalent monomer mixture that includes (a) at least one alkyl (meth)acrylate ester of a non-tertiary alcohol having 1 to 14 carbon atoms and (b) at least one nitrogen-containing monomer. The block copolymer can be, for example, those commercially available from Shell Chemical Co. under the trade designation KRATON FG-1901X. Other suitable primer compositions include those commercially available under the trade designation NEOREZ (NEOREZ R551) from DSM NeoResins+, Wilmington, Mass. This primer composition contains waterborne polyurethane.

Compliant or Conformable Layers

The compliant or conformable layer may be a single or multilayer construction.

In some embodiments, the compliant or conformable layer has a thickness of at least 6 mils; at least 10 mils; at least 15 mils; at least 30 mils; at least 50 mils; at least 100 mils; at least 150 mils. In some embodiments, the multilayer carrier has a thickness of between about 6 mils and about 60 mils. In some embodiments, the compliant or conformable layer has a thickness of between about 10 mils and about 30 mils.

The compliant or conformable layer can have one or more polymeric film layers directly adjacent to it. The compliant or conformable layer can have one or more polymeric film layers attached to it using one or more layers of adhesive. The compliant or conformable layer can have one or more layers of adhesive used to attach the compliant or conformable layer to the one or more hardgoods.

In some embodiments, the compliant or conformable layer is an adhesive. In some embodiments, the compliant or conformable layer is a pressure-sensitive adhesive. In some embodiments, the compliant or conformable layer fulfills the Dahlquist criterion for pressure-sensitive tack.

In some embodiments, the compliant or conformable layer includes a (meth)acrylic polymer. The (meth)acrylic polymer comprises one or more (meth)acrylic ester monomers derived from a (e.g., non-tertiary) alcohol containing from 1 to 14 carbon atoms and preferably from 4 to 12 carbon atoms. In some embodiments, the (meth)acrylic polymer is a homopolymer. In some embodiments, the (meth)acrylic polymer is a copolymer of two or more monomers. In some embodiments, the (meth)acrylic polymer is a copolymerization of a polar (meth)acrylic monomer and an alkyl (meth)acrylic monomer. In some embodiments, the alkyl (meth)acrylic monomer has between 5 and 18 carbon atoms. The alkyl group on the (meth)acrylic monomer can be linear or branched. The glass transition of a polymer of the alkyl (meth)acrylic monomer can be between about −80 degrees Celsius and about 50 degrees Celsius. The polar (meth)acrylic monomer can be a (meth)acrylic monomer containing an acid group such as those derived from ethylenically unsaturated carboxylic acids or salts thereof and mixtures thereof. In some embodiments, the polar (meth)acrylic monomer can comprise a non-acid polar functionalized monomer including but not limited to the following: 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth) acrylate, 2-ethoxyethyl (meth)acrylate, 2-methoxyethoxyethyl (meth)acrylate, 2-methoxyethyl methacrylate, polyethylene glycol mono(meth)acrylates; alkyl vinyl ethers, including vinyl methyl ether; and mixtures thereof. In some embodiments, the polar monomers may comprise a mixture of acid functional and non-acid functional polar (meth) acrylate monomers. In some embodiments, the compliant portion can optionally comprise (meth)acrylic monomers copolymerized with vinyl monomers including vinyl esters (e.g., vinyl acetate and vinyl propionate), styrene, substituted styrene (e.g., α-methyl styrene), vinyl halide, and mixtures thereof. It is to be understood that in any case that the term acrylic polymer or (meth)acrylic polymer can refer to either an acrylic polymer or a methacrylic polymer.

In some embodiments, the compliant portion includes an acrylic that has been or can be crosslinked. The compliant portion may be crosslinked through the addition of crosslinkable monomers. The compliant portion may comprise a single crosslinking monomer, or a combination of two or more crosslinking monomers. Further, the crosslinking monomer may comprise two or more isomers of the same general structure. In some embodiments, the crosslinkable monomer may be a multifunctional (meth)acrylic monomer including but not limited to: di(meth)acrylates, tri(meth) acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, propoxylated glycerin tri(meth)acrylate, and mixtures thereof. In other embodiments, the crosslinking monomer comprises at least two terminal groups selected from allyl, methallyl, or combinations thereof. In one embodiment, the crosslinking monomer comprises two (meth)allyl groups and a (meth)acrylate group. In some embodiments, the crosslinkable monomer is dihydrocyclopentadienyl acrylate. In some embodiments, compliant portion may be crosslinked by one or more of the same or different crosslinkable groups. In some embodiments, the compliant portion may be crosslinked using radiation or thermally-induced crosslinking techniques known in the art.

In some embodiments, the compliant portion is comprised of (meth)acrylic copolymers made by various polymerization techniques including but not limited to solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

Interfaces in the compliant portion may be subjected to a priming treatment prior to being positioned adjacent to one or more of: a compliant portion, a polymeric film layer, or a pressure-sensitive adhesive layer. The priming treatment serves to increase adhesion between two layers within the stretch release adhesive tape construction. Any suitable priming treatment known in the art can be used. The priming treatment can include, for example, a chemical adhesion promoter.

In some embodiments, the compliant layer is a foam. In some embodiments, the compliant layer is an adhesive filled with expandable microspheres.

In some embodiments, the compliant portion contains inorganic particles. The particles may be added to the monomer mixture or added to the core layer following partial polymerization. The compliant portion can also contain multiple compositions, types, or sizes of inorganic particles. The inorganic particles in one compliant portion may be of the same or different composition and surface treatment. The inorganic particles can be distributed evenly in any of the core layers or can be distributed unevenly. The surface of the inorganic particles may be treated or functionalized to be hydrophobic or to be hydrophilic. The inorganic particles may be less than 20 microns in size. In many embodiments, the inorganic particles are fumed silica particles, examples may include AEROSIL® fumed silica R972. The inorganic particles can be well dispersed in the compliant layer or the inorganic particles can be agglomerated or non-agglomerated and aggregated or non-aggregated. The inorganic particles can be porous or non-porous. The inorganic particles can be comprised of metals, metal oxides, ceramics, and the like. Inorganic particles can be selected from but are not limited to silica, alumina, titania, zirconia, and the like.

The compliant portion may include one or more polymeric film layers. The polymeric film layers may be at least one of a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, and/or acid modifications. In some embodiments, the film contains polymers from olefin monomers with between 2 and 16 carbons. In some embodiments, the film is a copolymer of two or more olefin monomers. In some embodiments, the film contains polymers from olefin monomers with atactic, syndiotactic, or isotactic stereochemistry. In some embodiments, the film is a copolymer of one or more olefin monomers polymerized using a metallocene catalyst. In some embodiments, the film is comprised of vinyl copolymers such as poly(vinyl chloride), poly(vinyl acetate), and the like. In some embodiments, the film is a blend comprised of any of the polymers listed above. Exemplary suitable film materials can include SEBS, SEPS, SIS, SBS, polyurethane, ethyl vinylacetate (EVA), ultra low linear density polyethylene (ULLDPE), hydrogenated polypropylene, ethyl methyl acrylate (EMA), ultra low linear density polyethylene (ULLDPE), hydrogenated polypropylene, high density polyethylene (HDPE), low density polyethylene (LDPE), linear low density polyethylene (LLDPE, and combinations or blends thereof. In some embodiments, the polymeric film layers consist of multiple layers of any of the polymers listed above. In particular embodiments, the multiple layers include a core layer and one or more skin layers, as described in PCT Application No. US2017/016039 (Runge et al.), incorporated herein by reference in its entirety.

The polymeric film layers may be made using any method known in the art.

Polymeric Film Layer(s)

The polymeric film layer can be a single layer or a multilayer construction. More than one polymeric film layer can be present. The polymeric film layers can be comprised of any film-forming polymers.

The polymeric film layer(s) can include any components that permit it/them to have the desired properties. Some exemplary desired properties include promoting adhesion of the core layer(s) to the pressure sensitive adhesive layer(s). Other exemplary desired properties include elongation at break of greater than 50%.

In some embodiments, the polymeric film layer(s) includes at least one of a vinylaromatic copolymer, a linear low density polyethylene, a low density polyethylene, a high density polyethylene, a copolymer of ethylene and (meth) acrylate monomers, a copolymer of ethylene and (meth) acrylate monomers containing acid modifications, a copolymer of ethylene and vinyl acetate, a copolymer of ethylene and vinyl acetate containing acrylate, and/or acid modifications. In some embodiments, the film contains polymers from olefin monomers with between 2 and 16 carbons. In some embodiments, the film is a copolymer of two or more olefin monomers. In some embodiments, the film contains polymers from olefin monomers with atactic, syndiotactic, or isotactic stereochemistry. In some embodiments, the film is a copolymer of one or more olefin monomers polymerized using a metallocene catalyst. In some embodiments, the film is comprised of vinyl copolymers such as poly(vinyl chloride), poly(vinyl acetate), and the like. In some embodiments, the film is a blend comprised of any of the polymers listed above.

Exemplary suitable film materials can include SEBS, SEPS, SIS, SBS, polyurethane, ethyl vinylacetate (EVA), ultra low linear density polyethylene (ULLDPE), hydrogenated polypropylene, ethyl methyl acrylate (EMA), ultra low linear density polyethylene (ULLDPE), hydrogenated polypropylene, high density polyethylene (HDPE), low density polyethylene (LDPE), linear low density polyethylene (LLDPE, polyesters including polyethylene terephthalate (PET), and combinations or blends thereof. In some embodiments, the polymeric film layers consist of multiple layers of any of the polymers listed above. In particular embodiments, the multiple layers include a core layer and one or more skin layers, as described in PCT Application No. US2017/016039 (Runge et al.), incorporated herein by reference in its entirety.

The polymer films described herein can be produced using any method known in the art.

Adhesive Layer(s)

The adhesives used in the adhesive articles described herein can include any adhesive having the desired properties. In some embodiments, the adhesive releases cleanly from the surface of an adherend when the adhesive article is stretched at an angle of about 35° or less from a surface of the adherend. In some embodiments, the adhesive releases from a surface of an adherend when the adhesive article is stretched at an angle of about 35° or less from the adherend surface such that there are substantially no traces of the adhesive left behind on the surface of the adherend.

In other embodiments, the adhesive is peelable. In some embodiments, the adhesive releases cleanly from the surface of an adherend when the adhesive article is peeled at an angle of about 35° or less from a surface of the adherend. In some embodiments, the peelable adhesive releases from a surface of an adherend when peeled at an angle of about 35° or greater from the adherend surface such that there are substantially no traces of the adhesive left behind on the surface of the adherend. In some embodiments, the adhesive releases from a surface of an adherend through a combination of peel and stretch release mechanisms.

The adhesive can be, for example, any of the adhesives described in any of the following patent applications, all of which are incorporated by reference herein: PCT Patent Publication Nos. 2015/035556, 2015/035960, PCT Application Nos. US2017/014733 and US2017/015163, or U.S. Pat. No. 9,894,931.

In some embodiments, the adhesive may comprise at least one of tackified rubber adhesives, such as natural rubber, olefins, silicones, polyisoprene, polybutadiene, polyurethanes, styrene-isoprene-styrene and styrene-butadiene-styrene block copolymers, and other elastomers; and tackified or untackified acrylic adhesives such as copolymers of alkyl (meth)acrylate monomers and acrylic acid. The adhesive may comprise a single layer or multiple layers of the same or different adhesive compositions. In more specific embodiments, the adhesive may comprise at least one of crosslinked acrylic copolymer, acrylic block copolymer, and silicone elastomeric polymers. Suitable silicone elastomeric polymers include, for example, urea-based silicone copolymers, oxamide-based silicone copolymers, amide-based silicone copolymers, urethane-based silicone copolymers, and mixtures thereof. Such adhesives may be coated onto a backing layer 16 to form the adhesive article 8, or such adhesives may be used to form an adhesive article in the form of a single homogeneous layer of adhesive (i.e., without a backing layer).

In some embodiments, the adhesive is a pressure sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in the pressure sensitive adhesive. Exemplary pressure sensitive adhesives utilize one or more thermoplastic elastomers, e.g., in combination with one or more tackifying resins.

Some adhesives that can be used in the adhesive articles of the present disclosure have a glass transition temperature of about −125° C. to 15° C., as determined by dynamic mechanical analysis of the tan δ peak value. Some adhesives that can be used in the adhesive articles of the present disclosure have a storage modulus of about 400,000 Pa or less, or 300,000 or less at 25° C., as determined by dynamic mechanical analysis.

In some embodiments, the thickness of the adhesive on at least one of the first or second major surfaces of the multilayer carrier is about 1 μm to about 1 mm.

In some embodiments, the adhesives are tailored to achieve removal with no or minimal damage. Exemplary methods and articles for doing so are described in, for example, U.S. Pat. No. 6,835,452, PCT Application Nos. US2017/014733 and US2017/048654, each incorporated herein in their entirety.

Some peelable adhesives that can be used in the adhesive articles of the present disclosure have a glass transition temperature of about −125° C. to 15° C., as determined by dynamic mechanical analysis of the tan δ peak value. Some peelable adhesives that can be used in the adhesive articles of the present disclosure have a storage modulus of about 500,000 Pa or less, 400,000 Pa or less, 300,000 Pa or less, or 250,000 Pa or less at 25° C., as determined by dynamic mechanical analysis.

In some embodiments, the thickness of the peelable adhesive on at least one of the first or second major surfaces of the multilayer carrier is about 1 μm to about 1 mm.

In some embodiments, the peelable adhesives are tailored to achieve peel with no or minimal damage. Exemplary methods and articles for doing so are described in, for example, U.S. Pat. No. 6,835,452, PCT Application Nos. US2017/014733 and US2017/048654, each incorporated herein in their entirety.

Though the present disclosure relates generally to adhesive articles with stretch releasable and/or peelable adhesives, those of skill in the art will appreciate that the adhesive need not necessarily be easily removable or entirely removable from the adherend.

Adhesive Article(s)

In some embodiments, the adhesive article further includes a tab. The tab is an area that can be easily accessed by the user to assist in or begin to release the adhesive article from the adherend. The removal tab can be tacky from the outermost adhesive layer or non-tacky by being covered by layers of stretch film, non-stretch film, release liner, or from detackified adhesive.

In some embodiments, the adhesive article further includes one or more release liners. The release liner can be, for example, on either or both of the major surfaces of the adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. Preferred release liners are fluoroalkyl silicone polycoated paper. The release liners can be printed with lines, brand indicia, or other information.

In some embodiments, the adhesive articles of the present disclosure can be removed from a substrate or surface without causing damage. As used herein, the term "without causing damage" or "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

In some embodiments, the adhesive articles of the present disclosure have increased conformability.

Increased conformability can be shown, for example, by comparing the area of adhesive contact between the adhesive article and the substrate or surface to which the adhesive article is adhered. In some embodiments, the adhesive articles of the present disclosure have an area of adhesive contact with the substrate of at least about 20%; at least about 25%; at least about 30%; at least about 35%; at least about 40%; at least about 45%; at least about 50%; at least about 55%; at least about 60%; at least about 65%; at least about 70%; at least about 75%; or at least about 80%. In some embodiments, the adhesive articles of the present disclosure have an area of adhesive contact with the substrate of between about 20% and about 100%. In some embodiments, the adhesive articles of the present disclosure have an area of adhesive contact with the substrate of between about 40% and about 90%.

Some adhesive articles of the present disclosure have excellent shear strength. Some embodiments of the present disclosure have a shear strength of greater than 1800 minutes as measured according to ASTM D3654-82. Some embodiments of the present disclosure have shear strength of greater than 10,000 minutes as measured according to ASTM D3654-82.

Some adhesive articles of the present disclosure have a lower force of stretch debonding to make the adhesive article easier to remove (e.g., a force of between about 20 to about 100 oz/0.625 inch). Some adhesive articles of the present disclosure can have a higher force of stretch debonding as to permit handling the release tab by the user without accidental separation (e.g., a force of between about 100 and about 170 oz/0.625 inch). Some embodiments of the present disclosure have stretch debonding of between about 20 and about 170 oz/0.625 inch. Some embodiments of the present disclosure have stretch debonding of between about 45 and about 80 oz/0.625 inch.

Some adhesive articles of the present disclosure have an elongation at break of greater than 50% in at least one direction. Some adhesive articles of the present disclosure have an elongation at break of between about 50% and about 1200% in at least one direction.

Some adhesive articles of the present disclosure have a tensile strength at break sufficiently high so that the adhesive article will not rupture prior to being removed from an adherend at an angle of 35° or less.

Some adhesive articles of the present disclosure have a lower peel force to make the adhesive article easier to remove (e.g., a force between about 25 oz/in to about 50 oz/in). Some adhesive articles of the present disclosure can have a higher peel force as to permit handling of the adhesive article by the user without accidental separation (e.g., a force between about 50 oz/in to 100 oz/in). Some embodiments of the present disclosure have a peel force between about 20 oz/in to 90 oz/in. Some embodiments of the present disclosure have a peel force between about 30 oz/in to 70 oz/in.

Some adhesive articles of the present disclosure have a tensile strength at break sufficiently high so that the adhesive article will not rupture prior to being removed from an adherend at an angle of 35° or greater.

In some embodiments, the adhesive articles of the present disclosure exhibit enhanced conformability to a substrate or surface than prior art adhesive mounting articles. In some embodiments, the adhesive articles of the present disclosure hold more weight when adhered or attached to a substrate or surface than prior art adhesive mounting articles. In some embodiments, the adhesive articles of the present disclosure hold more weight for a longer period of time when adhered or attached to a substrate or surface than prior art adhesive mounting articles. In some embodiments, the adhesive articles of the present disclosure remain adhered to a textured, rough, or irregular surface for a longer period of time than prior art adhesive mounting articles. In some embodiments, the adhesive articles of the present disclosure hold a higher amount of weight when adhered to a textured, rough, or irregular surface than prior art adhesive mounting articles.

In some embodiments, the adhesive article and/or a portion or layer thereof is substantially optically clear. Some embodiments have a light transmission of at least about 50%. Some embodiments have a light transmission of at least about 75%. Some embodiments have a haze of no greater than 40%. Some embodiments, have a haze of no greater than 20%. Both the light transmission and the haze of the carrier (or at least some of the layers thereof) can be determined using, for example, ASTM D1003-95.

Exemplary poly(alkylene) copolymers that can be used to prepare optically clear backing layers are commercially available under the trade designation EXACT (e.g., EXACT 3024, 3040, 4011, 4151, 5181, and 8210) and VISTAMAXX (e.g., VISTAMAXX 6202 and 3000) from ExxonMobile Chemical (Houston, Tex.). Other exemplary poly(alkylene)

copolymers are commercially available under the trade designations AFFINITY (e.g., AFFINITY PT 1845G, PL 1845G, PF 1140G, PL 1850G, and PL 1880G), ENGAGE (e.g., ENGAGE 8003), and INFUSE (e.g., INFUSE D9530.05) from Dow Chemical (Midland, Mich.). EXACT 0210, EXACT 8210, EXACT 5181, ENGAGE 8003, and INFUSE D9530.05, are ethylene-octene copolymers. EXACT 3040 and EXACT 4151 are ethylene-hexene copolymers. EXACT 3024 and EXACT 4011 are ethylene-butene copolymers.

Hardgoods

Some embodiments further include a hardgood or mounting device. Exemplary hardgoods or mounting devices include, for example, hooks, knobs, clips, and loops. In some embodiments the hardgood resembles a nail. In some embodiments the hardgood has a single outward projection to act as a hanging surface. In some embodiments the hardgood has multiple outward projections to act as a hanging surface. In some embodiments, the hardgood has is molded into a shape that can hold one or more items within such as but not limited to a box or caddy. In some embodiments, the hardgood is a shelf, ledge, or rack. In some embodiments, the hardgood is a bar wherein the bar can be straight or curved or substantially a ring wherein the bar can be mounted parallel or normal to the substrate surface. In some embodiments, the hardgood uses multiple methods for mounting or hanging items. Any of the following mounting devices can be used with the adhesive article of the present disclosure: Application Matter No. 77486US002 (assigned to the present assignee), U.S. Pat. No. 5,409,189 (Luhmann), U.S. Pat. No. 5,989,708 (Kreckel), U.S. Pat. No. 8,708,305 (McGreevy), U.S. Pat. No. 5,507,464 (Hamerski et al.), U.S. Pat. No. 5,967,474 (doCanto et al.), U.S. Pat. No. 6,082,686 (Schumann), U.S. Pat. No. 6,131,864 (Schumann), U.S. Pat. No. 6,811,126 (Johansson, et al.), U.S. Pat. No. D665,653, and U.S. Pat. No. 7,028,958 (Pitzen, et al.), all of which are incorporated by reference in their entirety herein. The hardgood may be any object to be mounted to a substrate.

In some embodiments, the hardgood is mounted to the substrate in one or more places wherein one or more of the mounting locations contain a removable adhesive portion and a compliant layer described in this invention. In some embodiments, the hardgood is mounted using a combination of removable adhesive portions containing a compliant layer and conventional mechanical fasteners including but not limited to nails, screws, bolts, and rivets.

In some embodiments, the hardgood is made from of thermoplastic polymers. In some embodiments, the hardgood is made from thermoset polymers. In some embodiments, the hardgood is made using polyolefin materials. In some embodiments, the hardgood is made using polycarbonate materials. In some embodiments, the hardgood is made using high-impact polystyrene. In some embodiments, the hardgood is made using acrylonitrile-butadiene-styrene (ABS) terpolymers. In some embodiments, the hardgood is made using two or more polymeric materials. In some embodiments, the hardgood is made from metal. In some embodiments, the hardgood is made from stainless steel. In some embodiments, the metal is painted, glazed, stained, brushed, or coated to alter its appearance. In some embodiments the hardgood is made from ceramic. In some embodiments, the hardgood is made from glazed ceramic. In some embodiments, the hardgood is made from unglazed ceramic. In some embodiments, the hardgood is comprised of naturally-based materials such as wood, bamboo, particle board, cloth, canvas, or derived from biological sources, and the like. In some embodiments, the naturally-based materials may be painted, glazed, stained, or coated to change their appearance. In some embodiments, the hardgood is made using two or more materials from the list above. In some embodiments, the hardgood is made from two pieces that are reversibly or irreversibly attached, joined, or welded together.

In some embodiments, the hardgood comprises two pieces wherein the first piece acts as a mounting surface for attaching the compliant and removable layers to a substrate, and the second piece acts as a hanging member which may be used for hanging or mounting objects to the substrate. The two pieces may be reversibly attached using mechanical fasteners, hook and loop materials, or an additional adhesive layer.

The hardgood can be made using any method previously known in the art.

In some embodiments, the removable adhesive layer and compliant layer may be attached to the hardgood using a lamination process. In some embodiments, the removable adhesive layer and compliant layer may be attached to the hardgood using multiple lamination processes.

In some embodiments, the compliant layer and/or the removable adhesive layer may be attached to the hardgood using two or more injection molding steps in using one or more molds.

In some embodiments, the compliant layer and/or the removable adhesive layer may be attached manually by the end user.

In some embodiments, the adhesive article can further include a separable connector. Some exemplary separable connectors are described in, for example, U.S. Pat. Nos. 6,572,945; 7,781,056; 6,403,206; and 6,972,141, all of which are incorporated by reference in their entirety herein.

Method of Making the Adhesive Articles Described Herein

The adhesive articles described herein can be made in various ways. One embodiment involves disposing an adhesive onto or adjacent to a major surface of a multilayer carrier. In some embodiments, a second adhesive is disposed onto the other major surface of the multilayer carrier.

The adhesive can be disposed on the multilayer carrier in any known way, including, for example, the pressure sensitive adhesive composition can be coated onto a release liner, coated directly onto a carrier, or formed as a separate layer (e.g., coated onto a release liner) and then laminated to a carrier.

To improve adhesion of the pressure sensitive adhesive composition to the carrier, the carrier can be pretreated prior to applying, e.g., coating or laminating, the adhesive composition on the carrier. Examples of suitable treatments include corona discharge, plasma discharge, flame treatment, electron beam irradiation, ultraviolet (UV) radiation, acid etching, chemical priming and combinations thereof. The treatment can optionally be performed with a reactive chemical adhesion promoter including, e.g., hydroxyethylacrylate, or hydroxyethyl methacrylate, or another reactive species of low molecular weight.

Methods of Using the Adhesive Articles Described Herein

The peelable articles of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

To remove the adhesive article from the adherend, at least a portion of the adhesive article is peeled or stretched away from the adherend. In some embodiments, the angle of stretch is 35° or less. In embodiments where a tab is present, the user can grip the tab and use it to release or remove the adhesive article from the adherend.

Uses

The adhesive articles may be used in wet or high humidity environments such as those found in bathrooms. For example, they can be adhered to toilets (e.g., toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive article may also be used in low temperatures applications including outdoor applications and refrigerators. Useful outdoor applications include bonding articles such as signage to outdoor surfaces such as windows, doors and vehicles.

The adhesive articles may be used to mount various items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, body side molding on vehicles, carrying handles, signage applications such as road signs, vehicle markings, transportation markings, and reflective sheeting.

The adhesive articles may be used to mount items and materials, such as anti-slip mats or anti-fatigue mats, to a floor surface or the bottom of a tub or shower, or to secure items, such as area rugs, to a floor. The adhesive article can be used in various joining and assembling applications including such as adhering at least two containers (e.g., boxes) for later separation. The adhesive article can be used in various cushioning and sound deadening applications such as, for example, cushioning materials for placement beneath objects, sound insulating sheet materials, vibration dampening, and combinations thereof. The adhesive article can be used in various closure applications including container closures (e.g., box closures, closures for food containers, and closures for beverage containers), diaper closures, and surgical drape closures. The adhesive article can be used in various thermal insulation applications. The adhesive article can be used in various sealing applications such as in gaskets for liquids, vapors (e.g., moisture), and dust. The adhesive article can be used in various labels such as removable labels (e.g., notes, price tags, and identification labels on containers), and in signage. The adhesive article can be used in various medical applications (e.g., bandages, wound care, and medical device labeling such as in a hospital setting). The adhesive article can be used in various fastening applications such as fastening one object (e.g., a vase or other fragile object) to another object (e.g., a table or a book shelf). The adhesive article can be used in various securing applications such as fastening one or more components of a locking mechanism to a substrate (e.g., a child safety lock can be adhered to a cabinet or cupboard). The adhesive article can be used in various tamper indicating applications (e.g., tamper indicating articles). The adhesive article can also be incorporated in a variety of other constructions including, but not limited to, abrasive articles (e.g., for sanding), articles for sanding and polishing applications (e.g., buffing pads, disc pads, hand pads, and polishing pads), pavement marking articles, carpeting (e.g., backing for carpeting), and electronic devices (e.g., securing a battery within a housing in a cell phone or PDA (personal digital assistant) to prevent unwanted movement).

The adhesive article (i.e., those in adhesive tapes or single article) can be provided in any useful form including, e.g., tape, strip, sheet (e.g., perforated sheet), label, roll, web, disc, and kit (e.g., an object for mounting and the adhesive tape used to mount the object). Likewise, multiple adhesive articles can be provided in any suitable form including, e.g., tape, strip, sheet (e.g., perforated sheet), label, roll, web, disc, kit, stack, tablet, and combinations thereof in any suitable package including, for example, dispenser, bag, box, and carton.

The need also exists for a stretch release article with desirable optical properties that allow it to be used to affix a substrate, such as an optical lens or cover, to an optical display device, such as a cellular telephone or portable music player (e.g., MP3 players). In such end use applications, it is desirable that the adhesive article be optically clear.

The following examples describe some exemplary constructions of various embodiments of the adhesive articles and methods of making the articles described in the present application. The following examples describe some exemplary constructions and methods of constructing various embodiments within the scope of the present application. The following examples are intended to be illustrative, but are not intended to limit the scope of the present application.

EXAMPLES

Materials used in the various Examples below are shown in Table 1. Other test materials and general procedures are listed below.

TABLE 1

Material and supplier information

| Material | Supplier |
| --- | --- |
| 2-Ethyl hexyl acrylate (EHA) | BASF Corporation, Florham Park, NJ |
| Acrylic acid (AA) | BASF Corporation, Florham Park, NJ |
| IRGACURE 651, a photoinitiator | BASF Corporation, Florham Park, NJ |
| Dihydrocyclopentadienyl acrylate, a crosslinker (DCPA) | BASF Corporation, Florham Park, NJ |
| 3M Acrylic Plus Tape PT1100, Black, 1.14 mm | 3M Company, St. Paul, MN |
| 3M VHB ™ Tape 4905 | 3M Company, St. Paul, MN |
| 3M VHB ™ Tape 4910 | 3M Company, St. Paul, MN |
| EXACT 8201, an ethylene octene plastomer | ExxonMobil Corporation, Houston, TX |
| OPTEMA TC 120, an ethylene methyl acrylate (EMA) copolymer | ExxonMobil Corporation, Houston, TX |
| AEROSIL R972 fumed silica | Evonik Industries, Hanau-Wolfgang, Germany |
| HDK H15 fumed silica | Wacker Chemical Corporation Adrian, MI |
| Polyethylene terephthalate (PET) Film | 3M Company, St. Paul, MN |

Painted Drywall Panel Preparation

Drywall panels (obtained from Materials Company, Metzger Building, St. Paul, Minn.) were painted with Sherwin Williams DURATION Home Interior paint in Ben Bone color (obtained from the Sherwin-Williams Company of Cleveland, Ohio) or BEHR PREMIUM PLUS ULTRA Primer and Paint 2 in 1 Flat Egyptian Nile (obtained from Behr Process Corporation of Santa Ana, Calif.). Drywall panels painted with BEHR PREMIUM PLUS ULTRA Primer and Paint 2 in 1 Flat Egyptian Nile were painted using a 1.25" roller to give the drywall panel a light texture.

Procedure for painting drywall with paints: a first coat of paint was applied to a drywall panel by paint roller, followed by air drying for 24 hours at ambient conditions. A second coat of paint was applied dried at ambient conditions for 7 days. The panel was then stored at ambient conditions until use.

Test Methods

Static Shear Test Method

Static shear was determined according to the method of ASTM D3654-82 entitled, "Holding Power of Pressure-Sensitive Tapes," with the following modifications. The release liner(s), where present, was removed from the test sample. Test samples having the dimensions 0.5 in ×0.5 in (1.27 cm×1.27 cm) were adhered to the test substrate through the adhesive composition at 72° F. (22° C.) and 50% relative humidity by passing a 15 lb (6.8 kg) hand held roller over the length of the sample two times at a rate of 12 in/min (30.48 cm/min). A metal vapor coated polyester film having the dimensions 0.75 in ×4 in (1.91 cm×10.16 cm) as bonded to one side of the adhesive test sample for the purpose of attaching the load.

The test sample was allowed to dwell on the test substrate for 1 hour at 22° C. and 50% relative humidity; thereafter a 1 kg weight was applied to the metal vapor coated polyester film. The time to failure was recorded in minutes and the average value, calculated pursuant to procedures A and C of section 10.1 of the standard, for all of the test samples was reported. Three samples were tested and the average time to failure of the three samples and the failure mode each sample was recorded. A value was reported with a greater than symbol (i.e., >) when at least one of the three samples has not failed at the time the test is terminated (25,000 minutes).

Stretch Debond Force Test Method

A conventional variable angle peel jig was modified to be used with an IMASS adhesion tester (IMASS, Inc., Hingham, Mass.) to measure low angle debond forces for adhesive tape adhered to a test surface. The jig could securely hold a 2 in ×12 in (5.08 cm×30.5 cm) substrate. The jig was secured to the IMASS platen. A 0.625 in ×2.75 in (1.59 cm×6.99 cm) test sample was adhered to the substrate of interest to provide a bond area of 0.625 in ×2 in (1.59 cm×5.08 cm). The test sample had a 0.625 in ×0.75 in (1.59 cm×1.91 cm) non-adhering tab for clamping to the IMASS tester. A 1.59 cm×5.08 cm×0.16 cm high impact polystyrene flat piece was bonded to the side of a test sample opposite the substrate. The test sample was then conditioned for 1 hour under conditions of 50% relative humidity and 22° C. and was then debonded at a peel speed of 30 in/min (76.2 cm/min) and at a peel angle of 2°. The average debond force required to stretch the backing for removal from the substrate was recorded in units of ounce (oz) per inch width with forces normalized for sample width. Three measurements were made from each substrate and the results were averaged.

% Adhesive Surface Contact Test Method

The first release liner from the stretch release adhesive tape test strip was removed and was applied to a rigid stainless steel backing using finger pressure. The second release liner was then removed. A thin layer of STAZON Multi-Surface Ink in Jet Black (Tsukineko Co., Japan), was applied evenly to the stretch release adhesive strip using a hard rubber brayer. Before the ink dried, the inked surface of the stretch release adhesive tape was rolled onto the smooth side of a Cracked Ice White Acrylic Lighting Panel (Plaskolite Inc., Columbus, Ohio) with a single pass using a 5 lb roller. The inked stretch release adhesive strip was held on the surface using finger pressure for three seconds. The inked adhesive strip was then gently peeled from the surface. The transferred ink was allowed to dry for one hour. Areas darkened due to ink transfer were considered areas with adhesive contact to the surface. A digital camera was used to take photographs of the inked test surface. Imaging software was used to determine the percent area with adhesive contact.

Comparative Example C1

Comparative Example C1 was a commercially available product, TESA POWERBOND double-sided mounting tape, Product No. 55791-00003, Tesa SE, Hamburg, Germany.

Comparative Example C2

Comparative Example C2 was an adhesive strip provided with a commercially available product, PERMA Clear Removable Hooks, Product No. 826, Perma Products, Brookvale, NSW, Australia.

Examples 1-2

The conformable pad and stretch release strip article of Example 1 was made by removing one release liner from the comparative product stretch release strip C1 and laminating the adhesive layer of 3M Acrylic Plus Tape PT1100 to the exposed adhesive surface using finger pressure. The conformable pads were cut to the same dimensions as the exposed adhesive from C1 prior to lamination. Release liners from the conformable pad and stretch release strip were removed prior to use.

The conformable pad and stretch release strip article of Example 2 was made by removing one release liner from the comparative product stretch release strip C2 and laminating the adhesive layer of 3M Acrylic Plus Tape PT1100 to the exposed adhesive surface using finger pressure. The conformable pads were cut to the same dimensions as the exposed adhesive from C2 prior to lamination. Release liners from the conformable pad and stretch release strip were removed prior to use.

Examples 3-4

Acrylic Core Formulation

The acrylic core material of Example 3 and Example 4 was made by charging a quart jar (about 500 mL) with 94 parts 2EHA, 6 parts AA, 2 phr of DCPA crosslinker, 4 phr fumed silica, and 0.2 phr of IRGACURE 651. As used herein, the abbreviation "phr" refers to parts per 100 parts resin. The monomer mixture was purged with nitrogen for 5 minutes and then exposed to low intensity ultraviolet radiation until a coatable prepolymer syrup was obtained. Subsequently, an additional 0.75 phr of IRGACURE 651 was added and the formulation was mixed thoroughly by rolling over night. The formulation was then coated between release liners and cured by 1500 mJ/cm$^2$ of UVA light for 2.5 minutes. The wet coating thickness was 25 mils.

Preparation of Conformable Layer

A three layer multilayer film was prepared having 0.5 mil thick outer skin layers of OPTEMA TC 120 and a 0.8 mil thick core layer of EXACT 8201. The multilayer film was prepared using a blown film extrusion process as is known in the art. Both sides of the multilayer film were treated with 4298UV primer. The films were allowed to dry at ambient temperature for 5 minutes to allow for the removal of any solvent.

For each of the Examples 3-4, the release liner was removed from the acrylic core material, and with the multilayer film stretched taut, of the acrylic core material was laminated to one side of the film. The acrylic core was applied to the multilayer film so that the final adhesive test strips were cut in the cross-direction of the multilayer film relative to the direction of film extrusion. An adhesive coated liner was then laminated to the side of the film/acrylic core construction using two passes through a laboratory laminator operating at 12 inches per minute and 20 psi nip pressure. The adhesive coating thickness was 16.5 grains/24 in$^2$ (2.75 mil). The adhesive used for Examples 3-6 was similar to the adhesive composition E27 described in PCT Publication No. WO2015/195602 except the adhesive contained 65 phr Finaprene 411 SBS resin and 35 phr SOL-PRENE® resin. The other side of the acrylic core material was laminated to a 1 mil primed PET film using two passes through a laboratory laminator operating at 12 inches per minute and 20 psi nip pressure.

Preparation of Conformable Stretch Release Article

The conformable stretch release article of Example 3 was prepared by removing one release liner from the comparative product stretch release strip C1 and laminating the PET film side of the acrylic conformable layer to the exposed adhesive surface using finger pressure. The conformable pads were cut to the same dimensions as the exposed adhesive from C1 prior to lamination. Release liners from the conformable pad and stretch release strip were removed prior to use.

The conformable stretch release article of Example 4 was prepared by removing one release liner from the comparative product stretch release strip C2 and laminating the PET film side of the acrylic conformable layer to the exposed adhesive surface using finger pressure. The conformable pads were cut to the same dimensions as the exposed adhesive from C2 prior to lamination. Release liners from the conformable pad and stretch release strip were removed prior to use.

Example 5

The conformable stretch release article of Example 5 was the same construction as that described for Examples 4 except that the acrylic core material was 3M VHB™ Tape 4905. The core thickness was 20 mils.

Example 6

The conformable stretch release article of Example 6 was the same construction as that described for Examples 5 except that the acrylic core material was 3M VHB™ Tape 4910. The core thickness was 40 mil.

TABLE 2

Static Shear and % Adhesive Surface Contact Properties

| Example | Shear - Glass (min)$^a$ | Shear - Glass St. Dev. (min) | Shear - Drywall (min)$^b$ | Shear - Drywall St. Dev. (min) | % Adhesive Surface Contact | % Adhesive Surface Contact St. Dev |
|---|---|---|---|---|---|---|
| C1 | >25,000 | 1 | 7 | 4 | 38.5 | 8.1 |
| 1 | 646 | 34 | 389 | 34 | 79.9 | 3.4 |
| 3 | >25,000 | 1 | 6 | 3 | 66.8 | 3.1 |
| C2 | 9770 | 5259 | 13 | 7 | 12.9 | 0.3 |
| 2 | 268 | 24 | 240 | 25 | 40.7 | 5.8 |
| 4 | 6764 | 526 | 455 | 399 | 42.0 | 5.8 |
| 5 | 2071 | 2870 | 40 | 46 | 40.7 | 2.1 |
| 6 | 1146 | 525 | 9 | 4 | 46.0 | 5.3 |

$^a$Shear tests were performed on glass substrate.
$^b$Shear tests were performed on painted drywall with BEHR PREMIUM PLUS ULTRA ® Primer and Paint 2 in 1 Flat Egyptian Nile painted with a 1.25" nap roller.

TABLE 3

Stretch Debond Properties

| Example | Stretch Debond Force (oz/in)$^{c,d}$ | Stretch Debond Force (oz/in) St. Dev |
|---|---|---|
| C1 | 66.3 | 1.3 |
| 1 | No Data | No Data |
| 3 | 60.0 | 4.3 |
| C2 | 195.5 | 11.0 |
| 2 | No Data | No Data |
| 4 | 220.0 | 8.5 |
| 5 | No Data | No Data |
| 6 | No Data | No Data |

$^c$Stretch debond tests were performed on drywall painted with Sherwin Williams DURATION Home Interior paint in Ben Bone color.
$^d$Data was normalized by sample width and expressed in oz/in.

Embodiments

1. An adhesive article, comprising: a releasable layer having a first major surface and a second major surface; the second major surfaces including a pressure sensitive adhesive capable of adhering the adhesive article to a surface; a compliant layer having a first major surface and a second major surface; the second major surface of the compliant layer adjacent to the first major surface of the releasable layer; and a hardgood adjacent to the first major surface of the compliant layer;

2. The adhesive article of embodiment 1, wherein the releasable layer debonds from both the surface and the compliant layer when the adhesive article is stretch released at an angle of less than 35 degrees, and wherein the hardgood does not debond from the compliant layer when the adhesive article is stretch released at an angle of less than 35 degrees.

3. The adhesive article of any of the preceding embodiments, wherein the releasable layer includes a stretch releasable layer having a thickness of between about 10 microns and about 1500 microns.

4. The adhesive article of any of the preceding embodiments, wherein the releasable layer is a single layer.

5. The adhesive article of embodiment 4, wherein the releasable layer is a pressure sensitive adhesive.

6. The adhesive article of any of the preceding embodiments, wherein the releasable layer is a multilayer construction.

7. The adhesive article of any of the preceding embodiments, wherein the releasable layer includes a stretch releasable portion and an adhesive layer.

8. The adhesive article of any of the preceding embodiments, where in the releasable layer includes a stretch releasable portion positioned between two adhesive layers.

9. The adhesive article of embodiment 7 or 8, wherein the stretch releasable portion includes at least one of a single layer of film, a single layer of foam, multiple layers of film, multiple layers of foam, multiple layers of foam and film, and/or single or multiple layers of adhesive.

10. The adhesive article of embodiment 7-9, wherein the adhesive layer includes at least one of polyolefins, vinyl copolymers, olefinic copolymers, urethane, styrenic block copolymers, acrylic polymers and copolymers, a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, acid modifications, and/or combinations thereof.

11. The adhesive article of any of the preceding embodiments, wherein the releasable layer comprises a first stretch releasable layer and a second stretch releasable layer.

12. The adhesive article of embodiment 11, wherein the first and second stretch releasable layers are adjacent to the first and second major surfaces of the compliant layer.

13. The adhesive article of embodiment 11, wherein the first and second stretch releasable layers are adjacent to one another and are both adjacent to one major surface of compliant layer.

14. The adhesive article of any of the preceding embodiments, wherein the compliant layer has a thickness of between about 6 mils and about 60 mils.

15. The adhesive article of any of the preceding embodiments, wherein the compliant layer includes a compliant portion and one or more adhesive layers.

16. The adhesive article of any of the preceding embodiments, wherein the compliant layer includes more than one compliant portions.

17. The adhesive article of any of the preceding embodiments, wherein the complaint layer includes a film or foam layer between two compliant layers each of which are adjacent to an adhesive layer.

18. The adhesive article of any of the preceding embodiments, wherein the compliant layer increases the area of adhesive contact to the substrate by at least 10% according to the Percent Adhesive Surface Contact Test Method.

19. The adhesive article of any of the preceding embodiments, wherein the compliant layer increases the area of adhesive contact to the substrate by at least 40% according to the Percent Adhesive Surface Contact Test Method.

20. The adhesive article of any of the preceding embodiments, wherein the stretch releasable portion has an elongation at break of greater than 50%.

21. The adhesive article of any of the preceding embodiments, including an adhesive layer comprising at least one of natural rubber, polyisoprene, polybutadiene, polyurethane, styrene-isoprene-styrene, styrene-butadiene-styrene, styrene-ethylene/butylene-styrene, styrene-ethylene/propylene-styrene acrylic copolymer, acrylic block copolymer, silicone elastomeric polymers, and mixtures thereof.

22. The adhesive article of any of the preceding embodiments, wherein the hardgood includes at least one of a hook, a knob, a clip, a caddy, a box, and/or a loop.

23. The adhesive article of any of the preceding embodiments, wherein the adhesive article has an average thickness of between about 25 microns (1 mil) and about 1778 microns (70 mils).

24. The adhesive article of any of the preceding embodiments, further including a tab.

25. The adhesive article of any of the preceding embodiments, wherein the adhesive article has a visible light transmission of visible light transmission of at least about 70% as measured according to ASTM D1003-95.

26. The adhesive article of any of the preceding embodiments, wherein the adhesive article has a visible light transmission of visible light transmission of at least about 80% as measured according to ASTM D1003-95.

27. The adhesive article of any of the preceding embodiments, wherein the adhesive article has a haze of no greater than about 20% as measured according to ASTM D1003-95.

28. The adhesive article of any of the preceding embodiments, wherein the adhesive article has a haze of no greater than about 15% as measured according to ASTM D1003-95.

29. The adhesive article of any of the preceding embodiments, wherein the adhesive article removes from an adherend damage-free.

30. The adhesive article of any of the preceding embodiments, wherein the adhesive article exhibits a shear strength of greater than 10,000 minutes as measured according to ASTM D3654-82.

31. The adhesive article of any of the preceding embodiments, wherein the adhesive article exhibits a shear strength of greater than 25,000 minutes as measured according to ASTM D3654-82.

32. The adhesive article of any of the preceding embodiments, wherein the adhesive article exhibits a stretch debond force between about 20 and about 170 oz/0.625 inch.

33. The adhesive article of any of the preceding embodiments, wherein the article has a tensile strength at break sufficiently high so that a stretch releasable layer will not rupture prior to being stretched and removed from an adherend at an angle of 35° or less.

34. The adhesive article of any of the preceding embodiments, where the adhesive article releases from a surface of an adherend when the article is peeled at an angle of about 35° or greater from the adherend surface.

Reference throughout this specification to "one embodiment," "some embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

All references mentioned herein are hereby incorporated by reference in their entirety.

With reference to the Figures, like numerals are used to designate like components throughout the set of Figures.

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. An adhesive article, comprising:
a stretch-releasable layer having a first major surface and a second major surface;
the second major surfaces including a first pressure sensitive adhesive capable of adhering the adhesive article to a surface;
a compliant layer having a thickness between 10 mils and 30 mils and consisting of a second pressure sensitive adhesive sandwiched between a first and a second polymeric film;
the compliant layer having a first major surface defined by the first polymeric film and a second major surface defined by the second polymeric film, with the second major surface of the compliant layer adjacent to the first major surface of the releasable layer; and
a hardgood attached to the first major surface of the compliant layer, wherein the releasable layer debonds from both the surface and the compliant layer when the stretch-releasable layer is stretch released at an angle of less than 35 degrees, and wherein the hardgood does not debond from the compliant layer when the stretch-releasable layer is stretch released from the surface at an angle of less than 35 degrees, and wherein the adhesive article removes from an adherend damage-free.

2. The adhesive article of claim 1, wherein the second pressure sensitive adhesive including a (meth)acrylic polymer.

3. The adhesive article of claim 1, wherein the stretch-releasable layer has a thickness of between about 10 microns and about 1500 microns.

4. The adhesive article of claim 1, wherein the stretch-releasable layer is a single layer.

5. The adhesive article of claim 4, wherein the stretch-releasable layer is the first pressure sensitive adhesive.

6. The adhesive article of claim 1, wherein the stretch-releasable layer is a multilayer construction.

7. The adhesive article of claim 1, wherein the stretch-releasable layer includes a stretch releasable portion.

8. The adhesive article of claim 1, wherein the stretch-releasable layer includes a stretch releasable portion positioned between the first pressure sensitive adhesive layer and a third pressure sensitive adhesive layer.

9. The adhesive article of claim 7, wherein the stretch releasable portion includes at least one of a single layer of film, a single layer of foam, multiple layers of film, multiple layers of foam, multiple layers of foam and film, and single or multiple layers of adhesive.

10. The adhesive article of claim 1, wherein the compliant layer is attached to the hardgood via a third pressure sensitive adhesive.

11. The adhesive article of claim 1, wherein the compliant layer increases the area of adhesive contact to the surface by at least 10% according to the Percent Adhesive Surface Contact Test Method.

12. The adhesive article of claim 1, wherein the stretch-releasable layer has an elongation at break of greater than 50%.

13. The adhesive article of claim 1, wherein the first pressure sensitive adhesive comprises at least one of natural rubber, polyisoprene, polybutadiene, polyurethane, styrene-isoprene-styrene, styrene-butadiene-styrene, styrene-ethylene/butylene-styrene, styrene-ethylene/propylene-styrene acrylic copolymer, acrylic block copolymer, silicone elastomeric polymers, and mixtures thereof.

14. The adhesive article of claim 1, wherein the adhesive article exhibits a shear strength of greater than 10,000 minutes as measured according to ASTM D3654-82.

15. The adhesive article of claim 1, wherein the adhesive article has a tensile strength at break sufficiently high so that the stretch-releasable layer will not rupture prior to being stretched and removed from an adherend at an angle of 35° or less.

* * * * *